United States Patent
Eklund et al.

(10) Patent No.: US 9,832,050 B1
(45) Date of Patent: Nov. 28, 2017

(54) SHOCK SENSOR RESONANCE DETECTION FOR NOTCH FILTER TUNING

(71) Applicant: Western Digital Technologies, Inc., Irvine, CA (US)

(72) Inventors: Erik J. Eklund, Newport Beach, CA (US); Timothy A. Ferris, Mission Viejo, CA (US)

(73) Assignee: Western Digital Technologies, Inc., Irvine, CA (US)

(*) Notice: Subject to any disclaimer, the term of this patent is extended or adjusted under 35 U.S.C. 154(b) by 0 days.

(21) Appl. No.: 15/354,867

(22) Filed: Nov. 17, 2016

Related U.S. Application Data

(60) Provisional application No. 62/362,853, filed on Jul. 15, 2016.

(51) Int. Cl.
- *G11B 33/08* (2006.01)
- *H04L 25/49* (2006.01)
- *G11B 19/20* (2006.01)
- *G01P 15/08* (2006.01)

(52) U.S. Cl.
CPC ...... *H04L 25/4902* (2013.01); *G01P 15/0802* (2013.01); *G11B 19/20* (2013.01)

(58) Field of Classification Search
CPC ..... G11B 5/012; G11B 19/045; G11B 19/042; G11B 19/2018; G11B 5/02; G11B 33/08; G11B 3/61; G11B 25/043; G11B 33/121; G11B 19/2009; G11B 33/107; G11B 5/59694; G11B 5/09; G01H 13/00; G01H 11/08
USPC ......... 360/55, 97.19, 97.11, 97.12, 99.08, 65
See application file for complete search history.

(56) References Cited

U.S. PATENT DOCUMENTS

| | | | |
|---|---|---|---|
| 8,184,389 | B2 | 5/2012 | Finamore et al. |
| 9,099,101 | B1* | 8/2015 | Kudo .................. G11B 19/042 |
| 2011/0085260 | A1 | 4/2011 | Wada et al. |
| 2011/0303011 | A1 | 12/2011 | Fu et al. |

* cited by examiner

Primary Examiner — Nabil Hindi
(74) Attorney, Agent, or Firm — Foley & Lardner LLP

(57) ABSTRACT

A method of tuning a notch filter in a data storage device (DSD) including the notch filter and a shock detection system includes: adjusting pulse width modulator (PWM) frequency settings of a spindle drive signal; detecting a maximum noise level of an output signal of the shock detection system while adjusting the PWM frequency settings; and selecting a notch filter frequency corresponding to a PWM frequency setting at which the maximum noise level of the output signal of the shock detection system is detected.

30 Claims, 11 Drawing Sheets

SHOCK SENSOR RESONANCE DETECTION FOR NOTCH FILTER TUNING

CROSS-REFERENCE TO RELATED APPLICATION(S)

This application claims the benefit of U.S. Provisional Application No. 62/362,853, filed Jul. 15, 2016, the disclosure of which is incorporated herein in its entirety by reference.

BACKGROUND

A conventional shock sensor used in a data storage device (DSD), for example a hard disk drive (HDD), to detect mechanical shocks and prevent off-track writes (OTWs) may be designed as a cantilever beam structure with piezoelectric properties. A shock event causes the beam to deflect producing a small electric charge. The small electric charge produced by the shock sensor is amplified and filtered by a shock detection system and the output of the shock detection system is compared to a predetermined voltage threshold to determine whether the detected shock is large enough to require suspension of write operations. When the output of the shock detection system exceeds the predetermined voltage threshold, an interrupt signal is issued to the system-on-a-chip (SoC), which immediately suspends write operations to prevent overwriting data on adjoining tracks.

FIG. 1 is a diagram illustrating a DSD 100 including a conventional shock detection system. Referring to FIG. 1, the DSD 100 may include a disk 110 rotated by a spindle 115 coupled to a spindle motor 120 and a head 125 connected to an end of an actuator arm 130 which is rotated about a pivot by a voice coil motor (VCM) 135 to position the head 125 radially over the disk 110. The VCM 135 may controlled by a VCM drive signal 157 from a VCM control circuit 155. The disk may include a number of concentric data tracks each partitioned into a number of data sectors. The spindle motor 120 may be driven by a spindle drive signal 142 generated by a pulse width modulator (PWM) 140. A control unit 150 may control the PWM 140 and the VCM control circuit 155 and may receive input from a shock detection system 160.

FIG. 2A is a simplified block diagram of a shock detection system in accordance with various aspects of the present disclosure. The shock detection system 160 may include a shock sensor 165, a first gain stage (e.g., a charge amplifier) 170, a notch filter 175, additional circuitry including filters 180, for example, but not limited to, firmware tunable filters, and gain stages 185, and one or more window comparators 190. The shock detection system 160 may be configured to generate an interrupt signal to the control unit 150 upon detection of a mechanical shock exceeding a threshold.

Since the shock sensor 165 is typically designed as an under-damped cantilever beam structure (although other configurations can also be used), the mechanical response of the shock sensor 165 may be that of a second-order mechanical system with a pronounced resonance, usually with a Q-factor on the order of 50. As a result, any electrical noise, mechanical vibration, or other disturbances near the resonance frequency of the shock sensor 165 will be amplified and may cause the output signal 162 of the shock detection system 160 to exceed the predetermined voltage threshold. Therefore, a notch filter 175 may be used as part of the shock detection system 160 to suppress the resonance of the shock sensor 165 while minimizing the phase delay of the shock detection system 160 at lower frequencies to provide rapid detection of shock events.

FIG. 3 is a graph 300 illustrating example gain and phase plots of the shock detection system before and after application of a conventional fixed notch filter for a shock detection system output signal 162. Referring to FIG. 3, the example gain 310 and phase 320 plots of the shock detection system without a notch filter and the example gain 330 and phase 340 plots of the shock detection system output signal 162 after application of a conventional notch filter with a Q-factor of 1.0 when frequency of the notch filter ($f_{notch}$) is equal to the resonance frequency of the shock sensor ($f_{sensor}$) are shown.

To prevent OTWs due to external shocks and thermal pops (i.e., small, high-frequency shock events caused by mismatch of the thermal coefficients of expansion of the materials inside the DSD 100), maximum gain and minimal phase delay is required up to about 20 kHz. As illustrated by the gain 330 and phase 340 plots in FIG. 3, a notch filter Q-factor of 1.0 sufficiently suppresses the resonance frequency of the sensor while maintaining a flat output magnitude and minimizing the phase loss.

However, low-cost shock sensors typically used in DSDs have a wide part-to-part variation (approximately +/−20%) in actual resonance frequency. Therefore, if a fixed notch filter frequency is used, the Q-factor of the filter would have to be low which may result in a significant phase loss and large delay in responding to shocks.

FIG. 4 is a graph 400 illustrating example gain and phase plots before and after application of a conventional fixed notch filter for a shock detection system output signal 162. In FIG. 4, example gain 410 and phase 420 plots of the shock detection system output signal 162 without a notch filter and example gain 430 and phase 440 plots of the shock detection system output after a conventional notch filter with a Q-factor of 0.25 when frequency of the notch filter ($f_{notch}$) is not equal to the resonance frequency of the shock sensor ($f_{sensor}$) are shown. Referring to FIG. 4, the specified resonance frequency range of a typical shock sensor may be 44±8 kHz. With this wide range of part-to-part variation in resonance frequency (and without resonance detection), the Q-factor would need to be set to 0.25 to achieve sufficient resonance suppression (20 dB), leading to a large phase loss.

BRIEF DESCRIPTION OF THE DRAWINGS

Aspects and features of the present inventive concept will be more apparent by describing example embodiments with reference to the accompanying drawings, in which.

DETAILED DESCRIPTION

Figure 1:
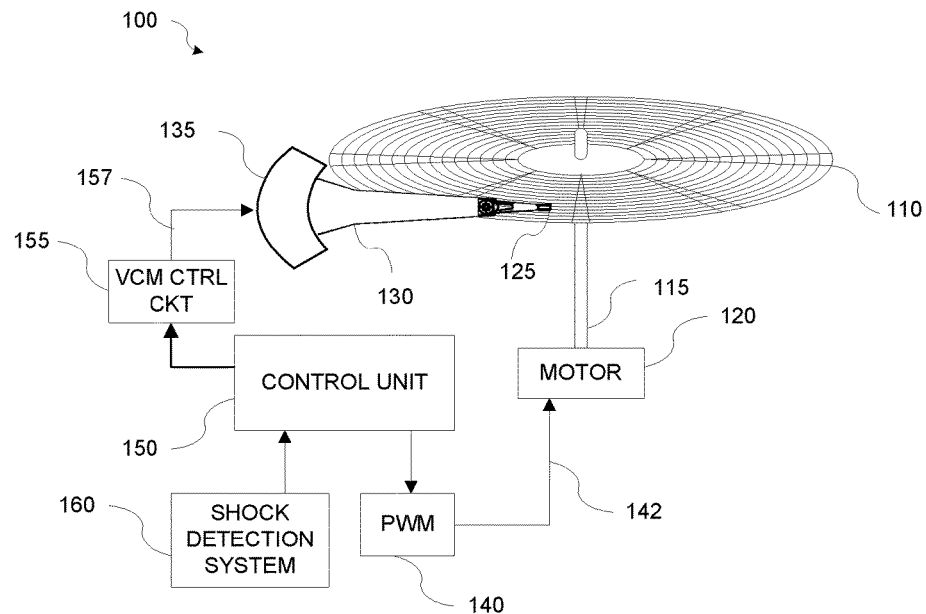
FIG. 1 is a diagram illustrating a DSD including a shock detection system in accordance with various aspects of the present disclosure.

While certain embodiments are described, these embodiments are presented by way of example only, and are not intended to limit the scope of protection. The methods and systems described herein may be embodied in a variety of other forms. Furthermore, various omissions, substitutions, and changes in the form of the example methods and systems described herein may be made without departing from the scope of protection.

Various aspects of the present disclosure provide methods for detecting the actual resonance frequency for a shock sensor in a DSD. The methods may enable a higher Q-factor of the notch filter and hence less propagation delay.

In various aspects, the control unit 150 may control the output frequency of the PWM 140 generating a spindle drive signal 142. The PWM output frequency, and hence the spindle drive signal 142, may be swept within a range of possible shock sensor resonance frequencies, for example, about 44±10 kHz, in order to cause a small vibration signal.

The noise level of the output signal 162 of the shock detection system 160 may be monitored and may reach a maximum when the output frequency of the PWM 140 (and hence spindle vibration) overlaps with and excites the resonance frequency of the shock sensor 165. Based on the detected resonance frequency of the shock sensor 165, a suitable frequency setting may be selected for the notch filter 175.

To monitor the noise level of the output signal 162 of the shock detection system 160 the control unit 150 may sample the output signal 162 of the shock detection system 160 and calculate maximum noise, for example as root-mean-square (RMS) noise while controlling the PWM 140 to step through the frequency settings. Alternatively, the control unit 150 may calculate maximum peak-to-peak (P-P) noise while controlling the output frequency settings of the PWM 140. The notch filter frequency may be selected based on the frequency at which the RMS or P-P noise of the output signal 162 of the shock detection system 160 reaches a maximum.

Figure 5:
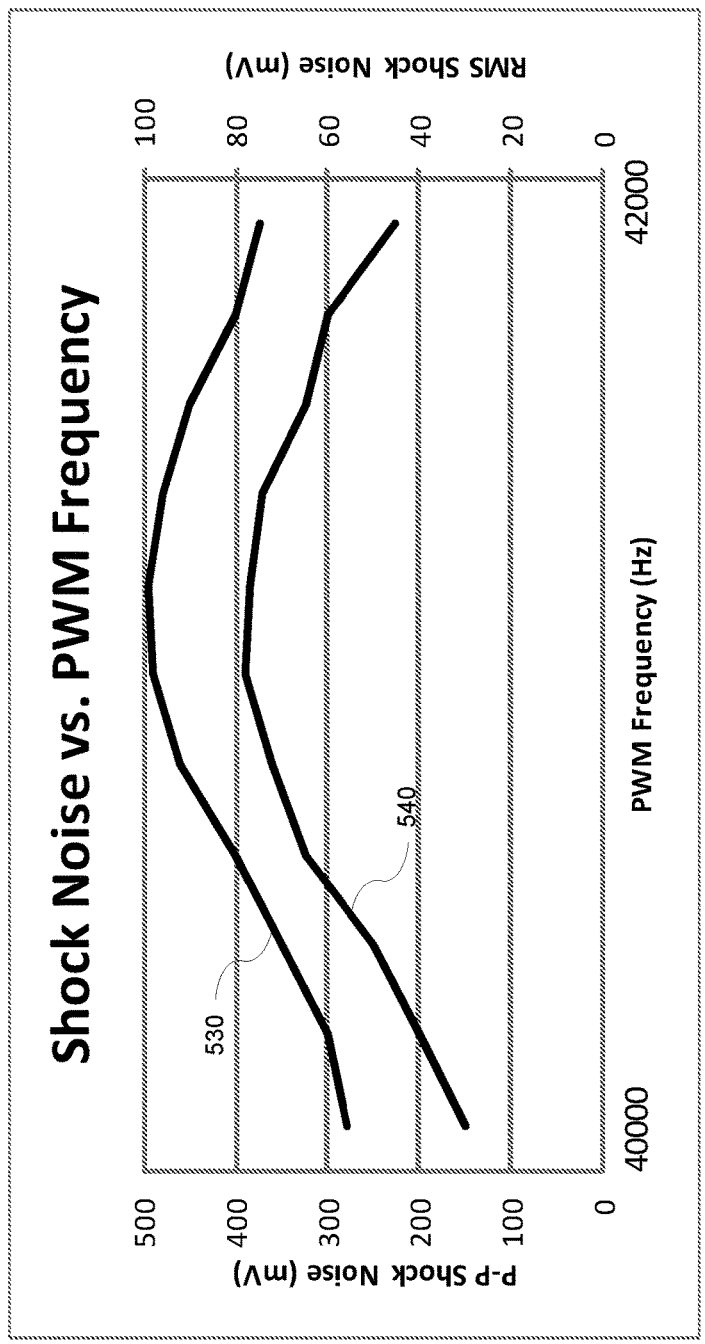
FIG. 5 is a graph illustrating example measurements of shock noise versus output frequency of the PWM generating the spindle drive signal for a DSD in accordance with various aspects of the present disclosure.

FIG. 5 is a graph 500 illustrating example measurements of shock noise versus output frequency of the PWM 140 generating the spindle drive signal 142 for a DSD 100 in accordance with various aspects of the present disclosure. Referring to the graph 500, P-P noise 530 and RMS noise 540 are plotted with respect to spindle frequency. Note that in the FIG. 5, the RMS shock noise varies substantially when the output frequency of the PWM 140 generating the spindle drive signal 142 is adjusted around the frequency at which the peak output signal 162 RMS shock noise is obtained. Shock sensor resonance frequency detection to within ±1 kHz may be achieved exceeding the current ±2 kHz requirement. Alternatively, multiple voltage settings for window comparators 190 of the shock detection system 160 may be utilized to detect the P-P noise value while adjusting the output frequency settings of the PWM 140. The notch filter frequency may be selected within a predetermined range, for example within ±2 kHz or another range, of the resonance frequency of the shock sensor 165.

To verify that the optimum notch filter frequency was selected, the worst-case PWM output frequency (i.e., the output frequency of the PWM 140 generating the spindle drive signal 142 producing the maximum noise level for the output signal 162 of the shock detection system 160) may be maintained while adjusting the output frequency settings of the PWM 140 to the nearest available frequency settings to the selected frequency for the notch filter 175, for example, within a range of about ±10 kHz or another range, of the selected notch filter frequency. The notch filter frequency may be selected within a predetermined range, for example within ±2 kHz or another range, of the resonance frequency of the shock sensor 165.

The notch filter frequency adjustment may eliminate the effect of variations of the actual notch frequency, as compared to the specified value, due to circuit tolerances. If an available frequency setting for the notch filter 175 within the predetermined PWM output frequency range provides increased noise suppression of the output signal 162 of the shock detection system 160, the available frequency setting for the notch filter 175 may be selected and applied as a new notch filter frequency.

Regardless of the method used to induce vibration in the shock sensor 165, before generating the signal to induce the vibration, firmware-tunable filters 180 in the shock detection system 160 are set in a manner that ensures maximum amplification of signals near the resonance frequency of the shock sensor 165 while suppressing other frequencies.

Figure 6:
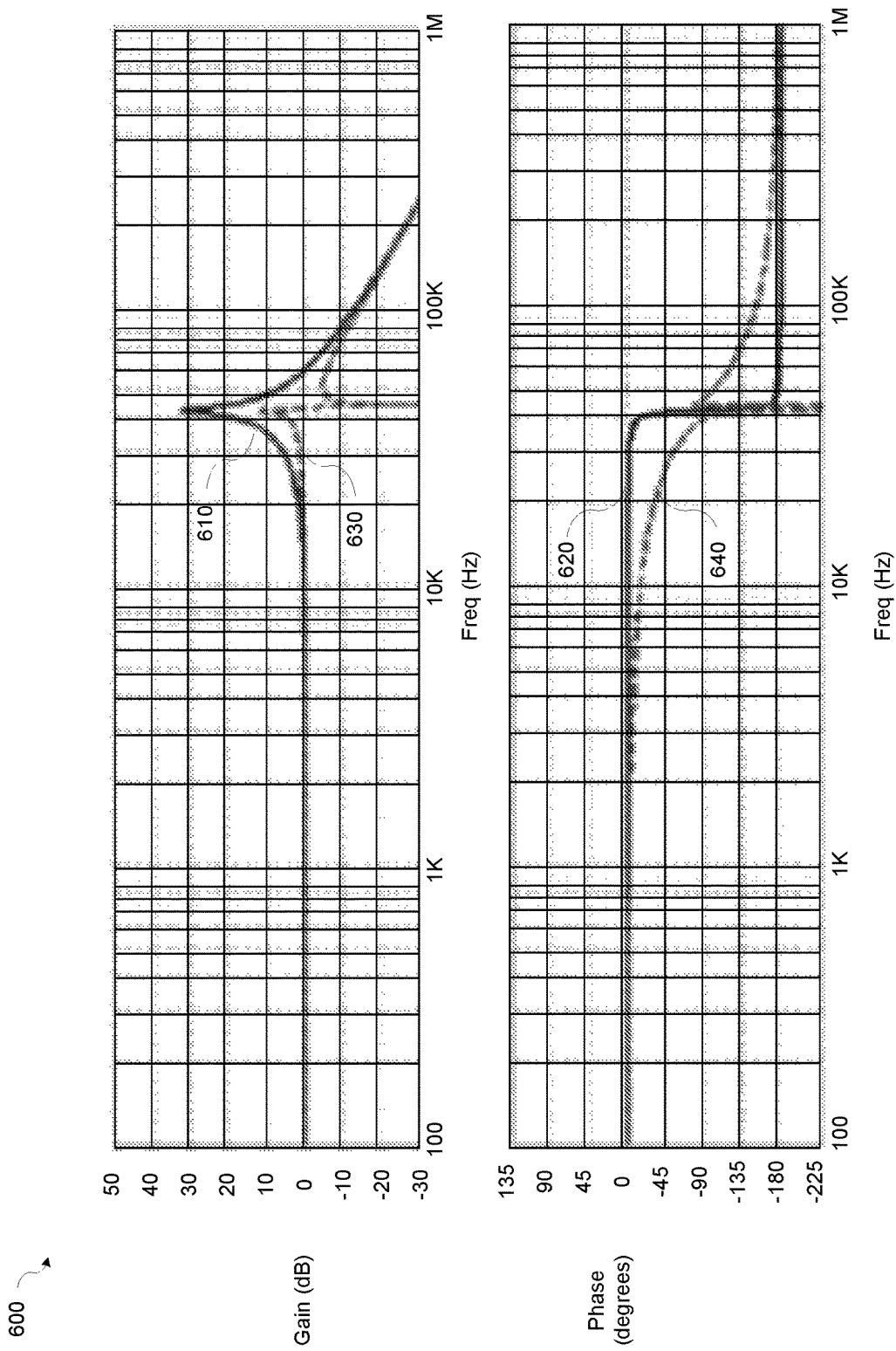
FIG. 6 is a graph illustrating example gain and phase plots before and after application of a notch filter for a shock detection system output signal in accordance with various aspects of the present disclosure.

FIG. 6 is a graph 600 illustrating example gain and phase plots before and after application of a notch filter for a shock detection system output signal 162 in accordance with various aspects of the present disclosure. Referring to FIG. 6 example gain 610 and phase 620 plots of a shock detection system output signal 162, and example gain 630 and phase 640 plots of the shock detection system output signal 162 after a notch filter with a Q-factor of 1.0 when mismatch between the frequency of the notch filter ($f_{notch}$) and the resonance frequency of the shock sensor ($f_{sensor}$) is reduced in accordance with various aspects of the present disclosure are shown. As illustrated in FIG. 6, when the resonance frequency of the shock sensor 165 is detected to within ±2 kHz, the currently required minimum 20 dB suppression may be achieved with Q-factor=1.0 and the phase delay may be minimized.

Figure 7:
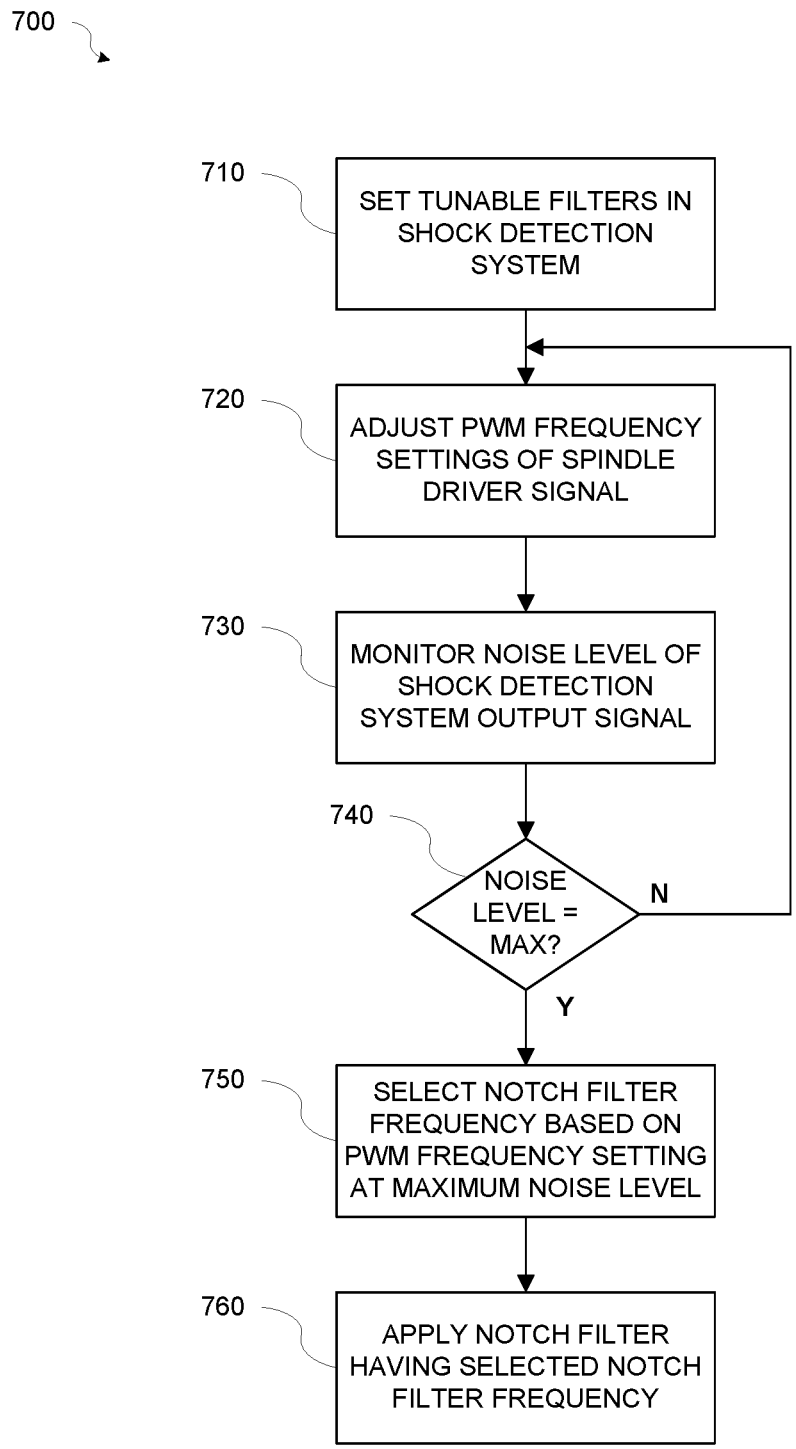
FIG. 7 is a flowchart illustrating a method for detecting shock sensor resonance in a DSD and tuning a notch filter in accordance with various aspects of the present disclosure.

FIG. 7 is a flowchart illustrating a method 700 for detecting shock sensor resonance in a DSD 100 and tuning a notch filter in accordance with various aspects of the present disclosure. Referring to FIG. 7, at block 710 tunable filters (e.g., the firmware-tunable filters 180) in the shock detection system 160 may be set to provide maximum amplification of signal frequencies near a resonance frequency of the shock sensor 165 while suppressing other frequencies. At block 720 the output frequency of the PWM 140 generating the spindle drive signal 142 may be adjusted up or down in increments of about 200 Hz, or any other increment, within a range of possible shock sensor resonance frequencies, for example about 44±10 kHz or another range, in order to cause a small vibration signal. For example, the control unit 150 may control the PWM 140 to repeatedly adjust the output frequency generating the spindle drive signal 142 to the spindle motor 120 up or down in increments of about 200 Hz or another increment.

At block 730, the noise level of the output signal 162 of the shock detection system 160 may be monitored as the output frequency of the PWM 140 is adjusted and the noise level may reach a maximum. For example, the control unit 150 may sample the output signal 162 of the shock detection system 160 and calculate maximum root-mean-square (RMS) noise while controlling the PWM 140 to step through the output frequency settings. Alternatively, the control unit 150 may calculate maximum peak-to-peak (P-P) noise, or any other noise figure of merit, while controlling the PWM 140 to step through the output frequency settings.

At block 740, it may be determined whether the noise level of the output signal 162 of the shock detection system 160 has reached a maximum. For example, the control unit 150 may determine that the RMS or P-P noise level of the output signal 162 is decreasing from a higher value. When a current noise level calculation at a current PWM frequency setting results in a lower output signal 162 noise level than a noise level calculated at an immediately preceding PWM frequency setting, the control unit 150 may determine that the previous output signal 162 noise level is the maximum noise level. The previous higher value may be determined as the maximum noise level.

Alternatively, output signal 162 noise levels may be calculated for each PWM frequency setting in a predetermined range of PWM frequency settings, for example about 44±10 kHz or another range, and the maximum output signal 162 noise level selected from the calculated noise levels.

The output signal 162 noise level may reach a maximum when the output frequency of the PWM 140 overlaps with and excites the resonance frequency of the shock sensor 165. In response to determining that the output signal 162 of the shock detection system 160 has not reached a maximum (740—N), at block 720 the output frequency of the PWM 140 may continue to be adjusted.

In response to determining that the output signal 162 of the shock detection system 160 has reached a maximum (740—Y), at block 750 a notch filter frequency may be selected based on the PWM frequency at the maximum noise level. For example, the notch filter frequency may be selected based on the frequency at which the RMS or P-P noise reaches a maximum. The notch filter frequency may be selected within a predetermined range, for example within ±2 kHz or another range, of the resonance frequency of the shock sensor 165. At block 760, the control unit 150 may apply the notch filter 175 having the selected notch filter frequency.

To verify that the optimum notch filter frequency was selected, the worst-case PWM frequency (i.e., the output frequency of the PWM 140 generating the spindle drive signal 142 producing the maximum output signal 162 noise level of the shock detection system 160) may be maintained while adjusting the notch filter through the nearest available frequency settings to the selected frequency for the notch filter 175, for example, within a range of about ±10 kHz of the selected notch filter frequency. The notch filter frequency may be selected within a predetermined range, for example within ±2 kHz or another range, of the resonance frequency of the shock sensor 165.

Figure 8:
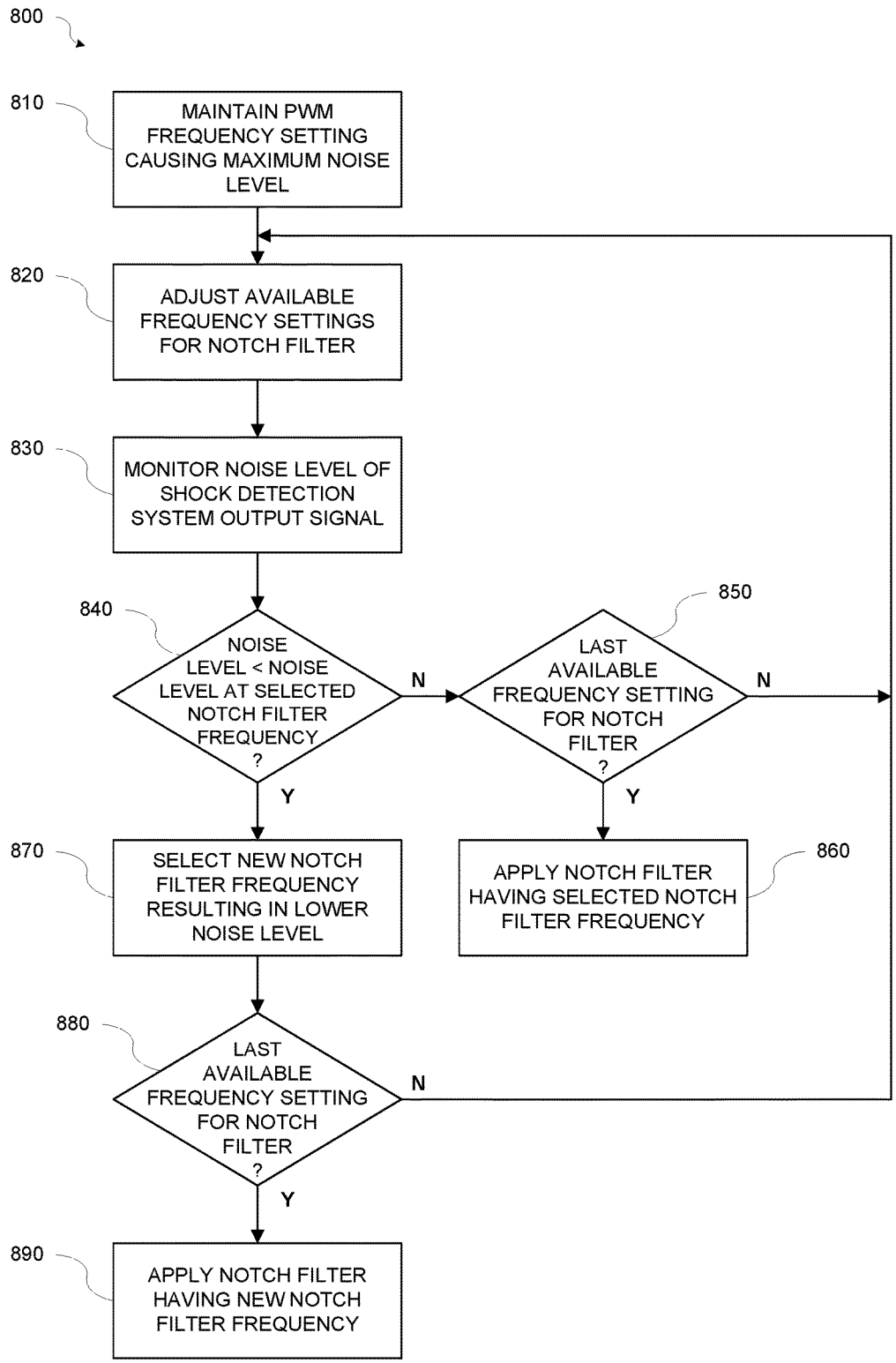
FIG. 8 is a flowchart illustrating a method for verifying that the optimum notch filter frequency was selected in accordance with various aspects of the present disclosure.

FIG. 8 is a flowchart illustrating a method 800 for verifying that the optimum notch filter frequency was selected in accordance with various aspects of the present disclosure. Referring to FIG. 8, at block 810 and the control unit 150 may control the PWM 140 to maintain the frequency setting causing the maximum noise level of the shock detection system output signal 162. At block 820 the notch filter frequency may be adjusted up or down in increments of about 100 Hz or another increment within a range of available notch filter frequency settings around the selected notch filter frequency. For example, the control unit 150 may control the notch filter 175 to repeatedly adjust the notch filter frequency setting up or down in increments of about 100 Hz or another increment.

At block 830, the noise level of the output signal 162 of the shock detection system 160 may be monitored as the notch filter frequency setting is adjusted. At block 840, it may be determined whether the noise level of the output signal 162 of the shock detection system 160 decreases from the noise level at the selected notch filter frequency. For example, the control unit 150 may determine that the noise level of the output signal 162 is decreasing from a higher value. When a current noise level calculation at a current notch filter frequency setting results in a lower output signal 162 noise level than a noise level calculated at the selected notch filter frequency, the control unit 150 may determine that the current notch filter frequency is a candidate for a new notch filter frequency.

Alternatively, output signal 162 noise levels may be calculated for each notch filter frequency in a predetermined range of notch filter frequencies around the selected notch filter frequency, for example about 44±10 kHz or another range, and the minimum noise level may be determined.

In response to determining that the current noise level of the shock detection system output signal 162 at the current notch filter frequency is not less than the noise level at the selected notch filter frequency (840—N), at block 850 the control unit 150 may determine whether the last available frequency setting for the notch filter 175 has been tested. In response to determining that the last available frequency setting for the notch filter 175 has been tested (850—Y), at block 860 the control unit 150 may apply the notch filter 175 having the selected notch filter frequency.

In response to determining that the last available frequency setting for the notch filter 175 has not been tested (850—N), the method may continue at operation 820 with the next available frequency setting for the notch filter 175.

In response to determining that the noise level of the shock detection system output signal 162 at the current notch filter frequency is less than the noise level at the selected notch filter frequency (840—Y), at block 870 the control unit 150 may select the current notch filter frequency as a new notch filter frequency.

At block 880 the control unit 150 may determine whether the last available frequency setting for the notch filter 175 has been tested. In response to determining that the last available frequency setting for the notch filter 175 has been tested (880—Y), at block 890, the control unit 150 may apply the notch filter 175 having the new notch filter frequency.

In response to determining that the last available frequency setting for the notch filter 175 has not been tested (880—N), the method may continue at operation 820 with the next available frequency setting for the notch filter 175.

Figure 2A:
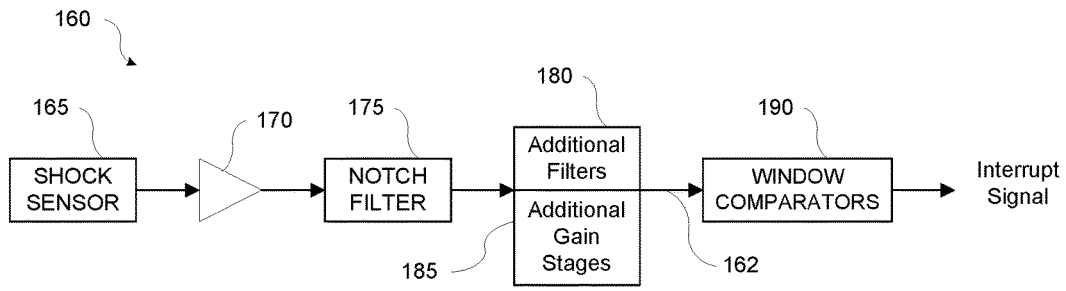
FIG. 2A is a simplified block diagram of a shock detection system in accordance with various aspects of the present disclosure.
Figure 2B:
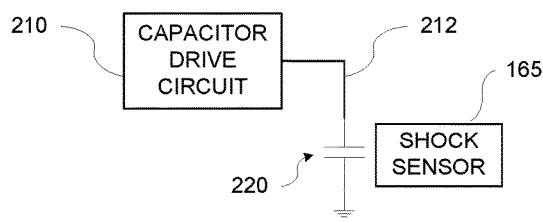
FIG. 2B is a block diagram illustrating a capacitor drive circuit and a multi-layer ceramic capacitor (MLCC) in accordance with certain aspects of the present disclosure.
Figure 3:
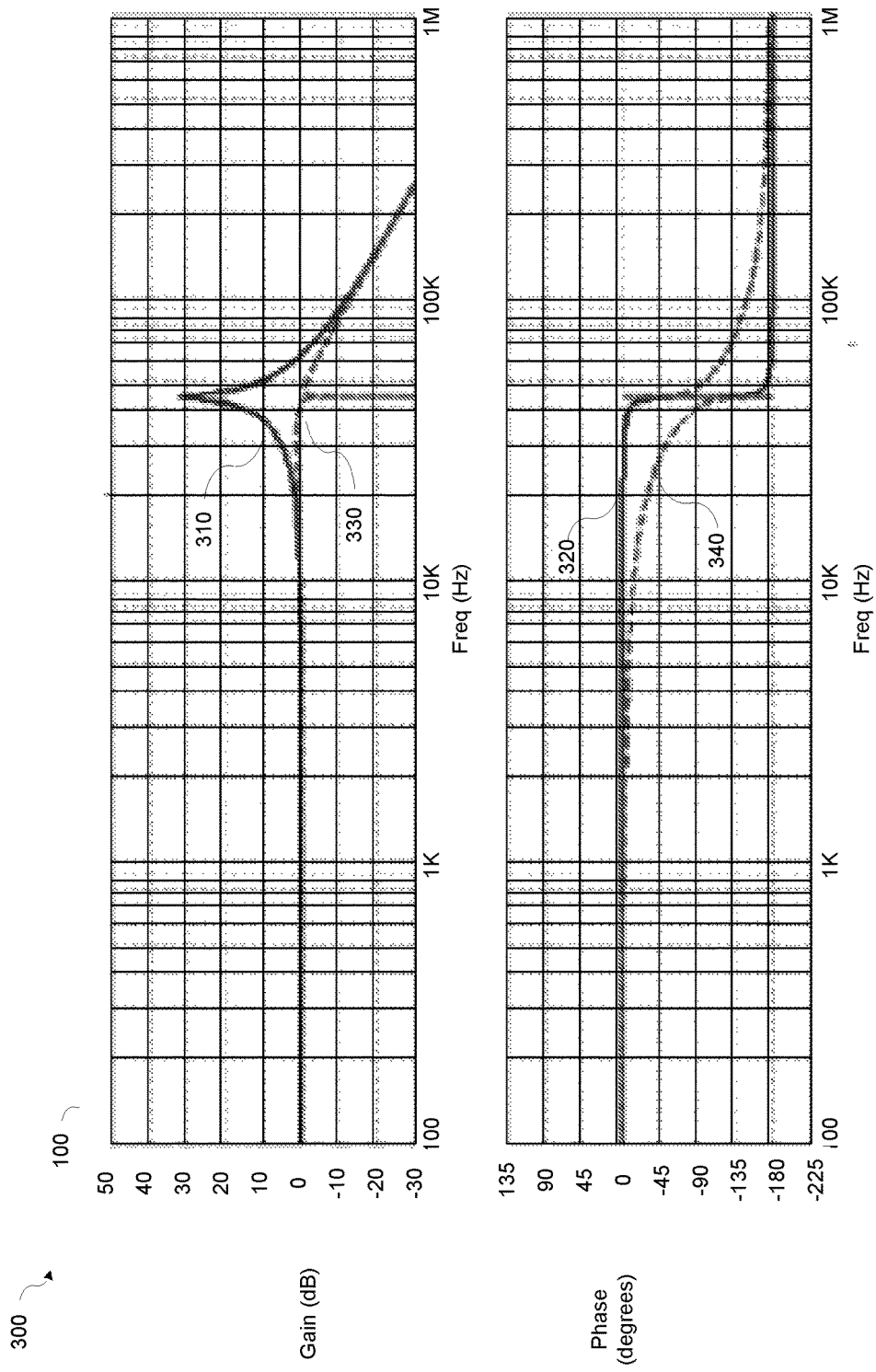
FIG. 3 is a graph illustrating example gain and phase plots before and after application of a conventional fixed notch filter for a shock detection system output signal.
Figure 4:
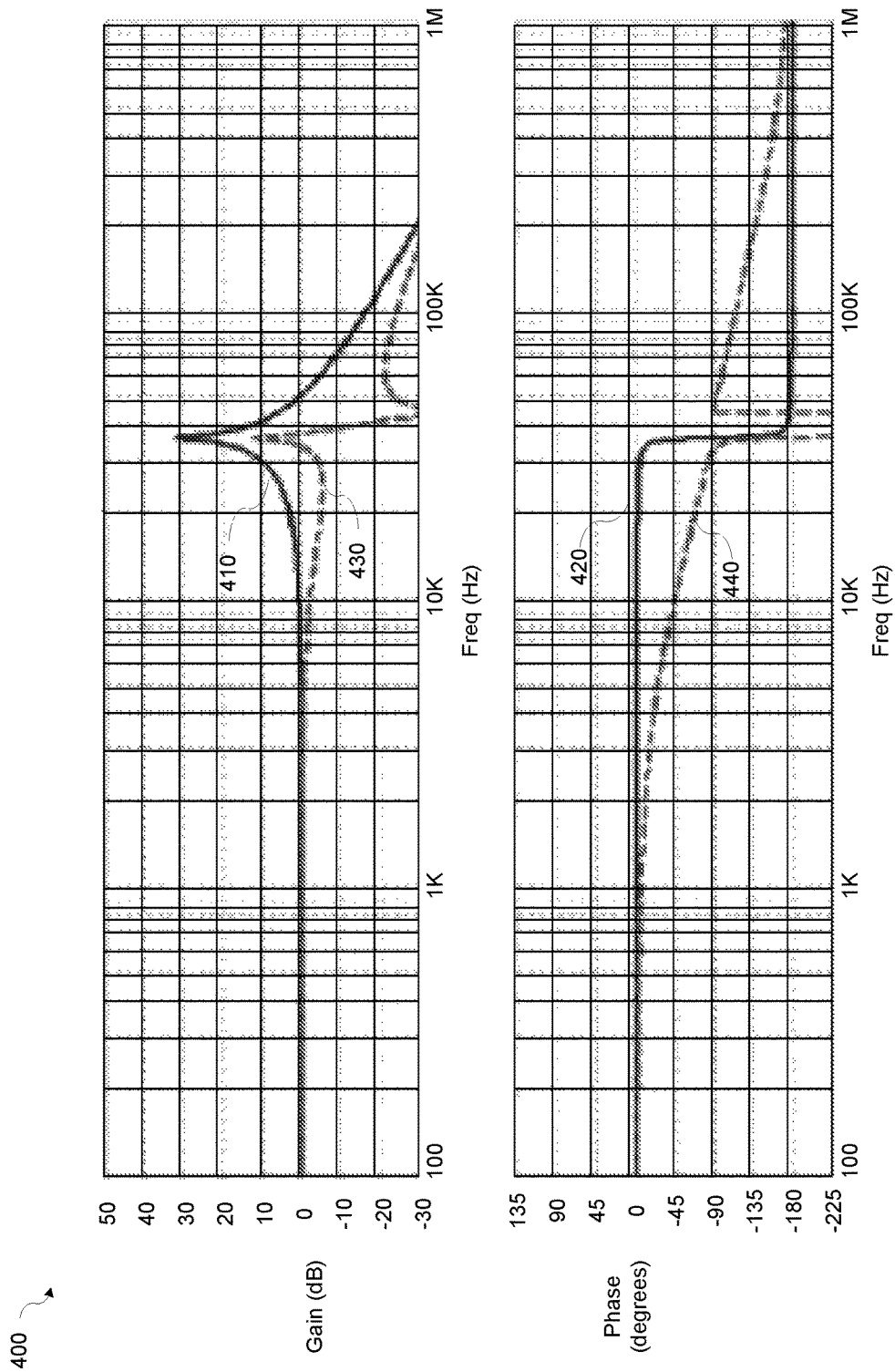
FIG. 4 is a graph illustrating example gain and phase plots before and after application of a conventional fixed notch filter for a shock detection system output signal.

In accordance with certain aspects of the present disclosure, other methods for inducing a vibration signal near the resonance frequency of the shock sensor 165 may be used. Large value multi-layer ceramic capacitors (MLCCs) having a capacitance of 10 μF or any other value may have a high dielectric constant material that expands and contracts when a varying bias voltage is applied. FIG. 2B is a block diagram illustrating a capacitor drive circuit 210 and an MLCC 220 in accordance with certain aspects of the present disclosure.

Referring to FIG. 2B, a dedicated MLCC 220 may be positioned near the shock sensor 165 on the printed circuit board (PCB) and may be driven with a capacitor drive circuit 210 incorporated into the DSD 100, for example as part of the circuitry of a large scale integrated (LSI) circuit (not shown). The capacitor drive circuit 210 may be configured to generate an alternating current (AC) voltage signal 212, for example, but not limited to, a sine wave, a square wave, or a triangle wave, of known frequency near the resonance frequency of the shock sensor 165 to drive the MLCC 220. For example, the frequency of the AC voltage signal 212 may be adjusted up or down in increments of about 200 Hz or another increment within a range of possible shock sensor resonance frequencies, for example about 44±10 kHz or another range, in order to cause a small vibration of the MLCC 220.

The noise level for the output signal 162 of the shock detection system 160 may reach a maximum value when the MLCC 220 is driven at the resonance frequency of the shock sensor 165. A resonance frequency detection and notch filter selection scheme similar to the scheme described with respect to the spindle drive signal 142 generated by the PWM 140 may be implemented.

Figure 9:
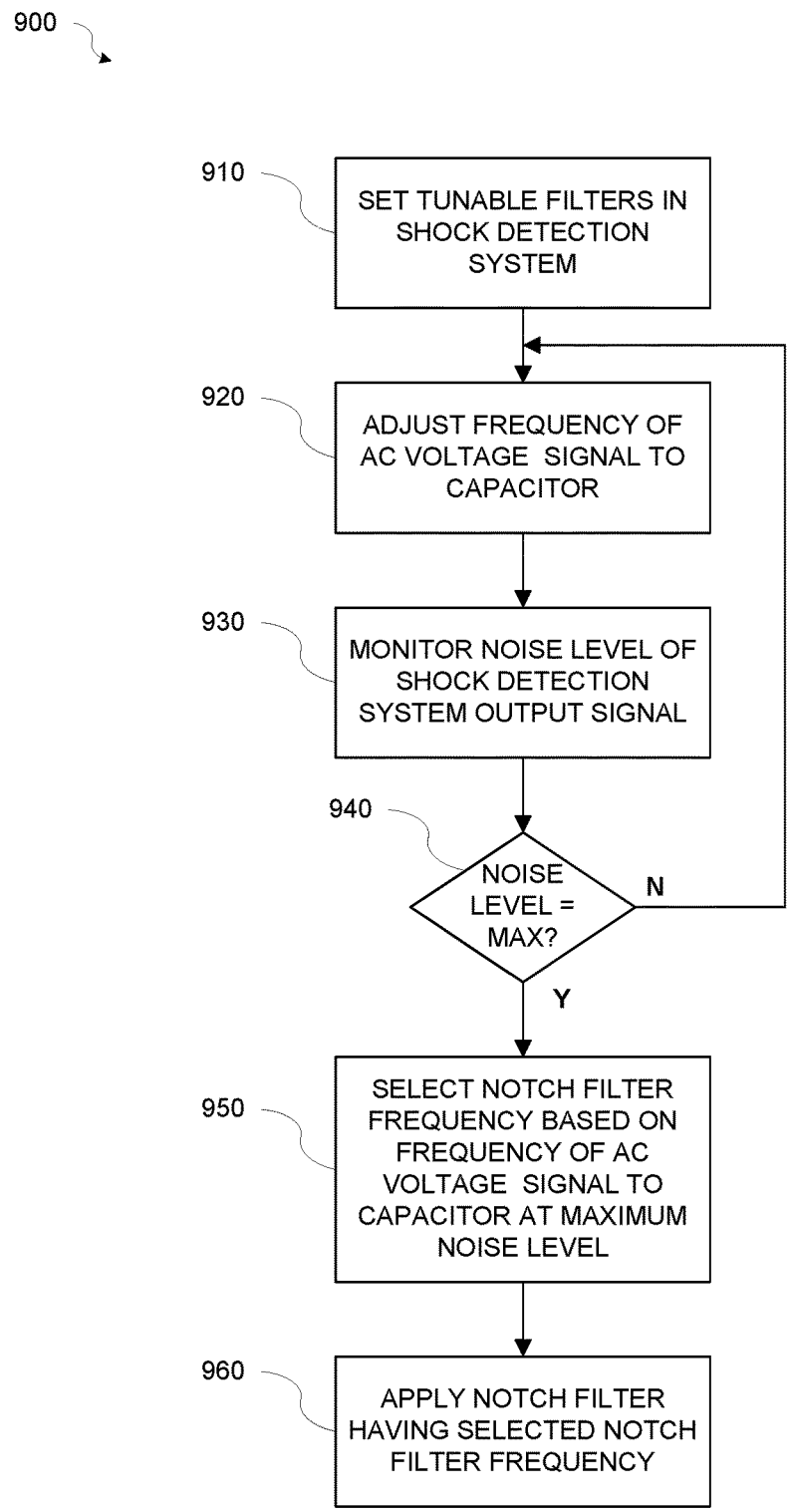
FIG. 9 is a flowchart illustrating a method for detecting shock sensor resonance in a DSD and tuning a notch filter in accordance with various aspects of the present disclosure.

FIG. 9 is a flowchart illustrating a method 900 for detecting shock sensor resonance in a DSD 100 and tuning a notch filter in accordance with various aspects of the present disclosure. Referring to FIG. 9, at block 910 tunable filters (e.g., the firmware-tunable filters 180) in the shock detection system 160 may be set to provide maximum amplification of signal frequencies near a resonance frequency of the shock sensor 165 while suppressing other frequencies.

At block 920 the frequency of the AC voltage signal generated by the capacitor drive circuit 210 to drive the MLCC 220 may be adjusted up or down in increments of about 200 Hz or another increment within a range of possible shock sensor resonance frequencies, for example about 44±10 kHz or another range, in order to cause a small vibration in the MLCC 220. For example, the control unit 150 may control the capacitor drive circuit 210 to repeatedly adjust the frequency of the AC voltage signal 212 up or down in increments of about 200 Hz or another increment.

At block 930, the noise level of the output signal 162 of the shock detection system 160 may be monitored as the frequency of the AC voltage signal 212 is adjusted and the noise level of the output signal 162 may reach a maximum. For example, the control unit 150 may sample the output signal 162 of the shock detection system 160 and calculate maximum root-mean-square (RMS) noise while controlling the capacitor drive circuit 210 to adjust the frequency of the AC voltage signal 212 driving the MLCC 220. Alternatively, the control unit 150 may calculate maximum peak-to-peak (P-P) noise, or any other noise figure of merit, while controlling the capacitor drive circuit 210 to adjust the frequency of the AC voltage signal 212 through the range of frequency settings.

At block 940, it may be determined whether the noise level of the output signal 162 of the shock detection system 160 has reached a maximum. For example, the control unit 150 may determine that the RMS or P-P noise level of the output signal 162 is decreasing from a higher value. When a current noise level calculation at a current AC voltage signal 212 frequency setting results in a lower output signal 162 noise level than a noise level calculated at an immediately preceding AC voltage signal 212 frequency setting, the control unit 150 may determine that the previous output signal 162 noise level is the maximum noise level. The previous higher value may be determined as the maximum noise level.

Alternatively, output signal 162 noise levels may be calculated for each AC voltage signal 212 frequency setting in a predetermined range of frequency settings, for example about 44±10 kHz or another range, and the maximum output signal 162 noise level selected from the calculated noise levels.

The output signal 162 noise level may reach a maximum when the frequency of the AC voltage signal 212 driving the MLCC 220 overlaps with and excites the resonance frequency of the shock sensor 165. In response to determining that the output signal 162 of the shock detection system 160 has not reached a maximum (940—N), at block 920 the frequency of the AC voltage signal 212 driving the MLCC 220 may continue to be adjusted.

In response to determining that the output signal 162 of the shock detection system 160 has reached a maximum (940—Y), at block 950 a notch filter frequency may be selected based on the frequency of the AC voltage signal 212 at the maximum noise level. For example, the notch filter frequency may be selected based on the frequency at which the RMS or P-P noise reaches a maximum. The notch filter frequency may be selected within a predetermined range, for example within ±2 kHz or another range, of the resonance frequency of the shock sensor 165. At block 960, the control unit 150 may apply the notch filter 175 having the selected notch filter frequency.

To verify that the optimum notch filter frequency was selected, the worst-case frequency of the AC voltage signal 212 driving the MLCC 220 (i.e., the output of the capacitor drive circuit 210 generating the AC voltage signal 212 producing the maximum output signal 162 noise level of the shock detection system 160) may be maintained while adjusting the notch filter through the nearest available frequency settings to the selected frequency for the notch filter 175, for example, within a range of about ±10 kHz of the selected notch filter frequency. The notch filter frequency may be selected within a predetermined range, for example within ±2 kHz or another range, of the resonance frequency of the shock sensor 165.

Figure 10:
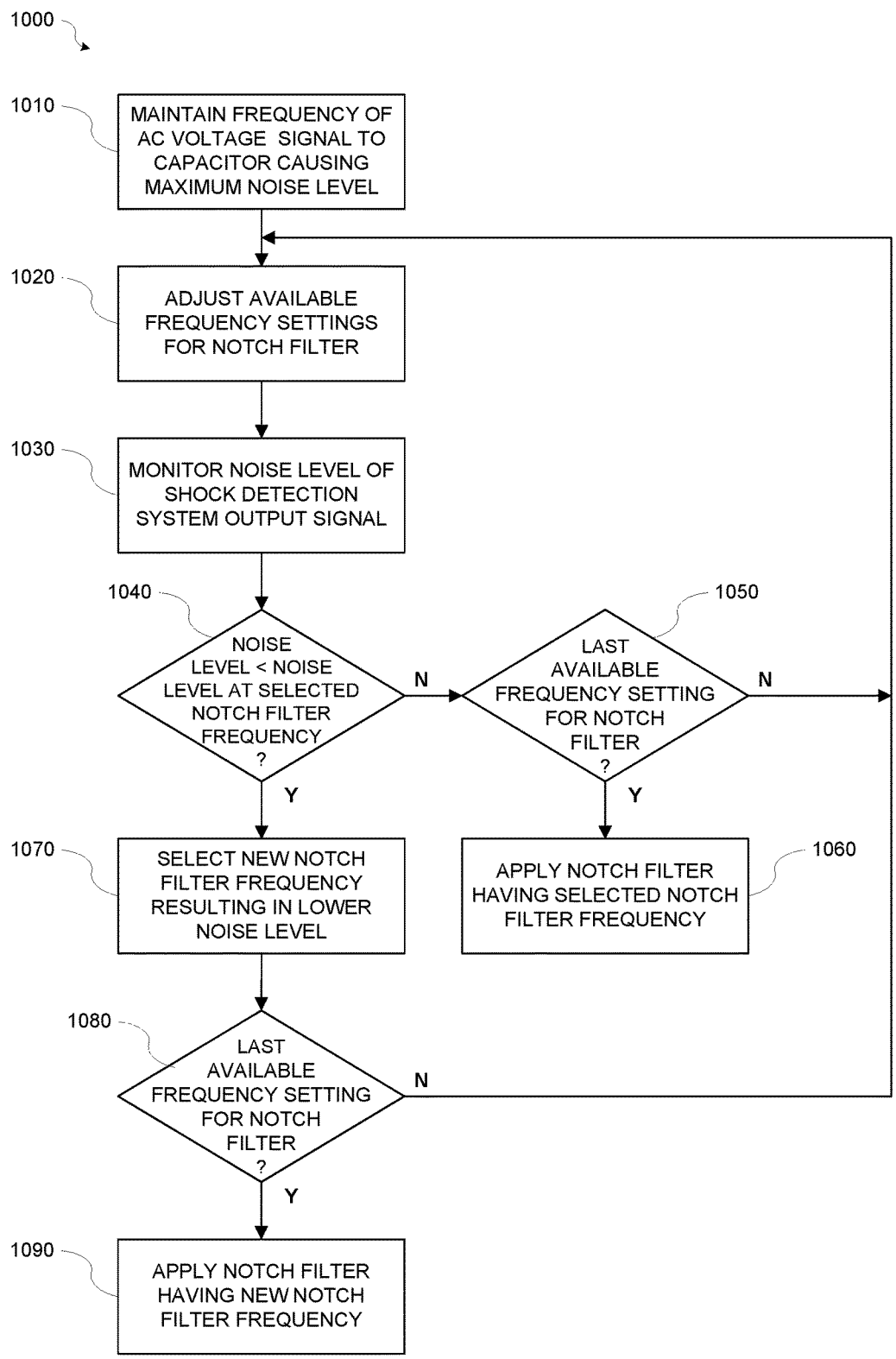
FIG. 10 is a flowchart illustrating a method for verifying that the optimum notch filter frequency was selected in accordance with various aspects of the present disclosure.

FIG. 10 is a flowchart illustrating a method 1000 for verifying that the optimum notch filter frequency was selected in accordance with various aspects of the present disclosure. Referring to FIG. 10, at block 1010 and the control unit 150 may control the capacitor drive circuit 210 to maintain the frequency setting of the AC voltage signal 212 causing the maximum noise level of the shock detection system output signal 162. At block 1020 the notch filter frequency may be adjusted up or down in increments of about 100 Hz or another increment within a range of available notch filter frequency settings around the selected notch filter frequency. For example, the control unit 150 may control the notch filter 175 to repeatedly adjust the notch filter frequency setting up or down in increments of about 100 Hz or another increment.

At block 1030, the noise level of the output signal 162 of the shock detection system 160 may be monitored as the notch filter frequency setting is adjusted. At block 1040, it may be determined whether the noise level of the output signal 162 of the shock detection system 160 decreases from the noise level at the selected notch filter frequency. For example, the control unit 150 may determine that the noise level of the output signal 162 is decreasing from a higher value. When a current noise level calculation at a current notch filter frequency setting results in a lower output signal 162 noise level than a noise level calculated at the selected notch filter frequency, the control unit 150 may determine that the current notch filter frequency is a candidate for a new notch filter frequency Alternatively, output signal 162 noise levels may be calculated for each notch filter frequency in a predetermined range of notch filter frequencies around the selected notch filter frequency, for example about 44±10 kHz or another range, and the minimum noise level may be determined.

In response to determining that the current noise level of the output signal 162 of the shock detection system 160 at the current notch filter frequency is not less than the noise level at the selected notch filter frequency (1040—N), at block 1050 the control unit 150 may determine whether the last available frequency setting for the notch filter 175 has been tested. In response to determining that the last available frequency setting for the notch filter 175 has been tested (1050—Y), at block 1060 the control unit 150 may apply the notch filter 175 having the selected notch filter frequency.

In response to determining that the last available frequency setting for the notch filter 175 has not been tested (1050—N), the method may continue at operation 1020 with the next available frequency setting for the notch filter 175.

In response to determining that the noise level of the output signal 162 of the shock detection system 160 at the current notch filter frequency is less than the noise level at the selected notch filter frequency (1040—Y), at block 1070 the control unit 150 may select the current notch filter frequency as a new notch filter frequency.

At block 1080 the control unit 150 may determine whether the last available frequency setting for the notch filter 175 has been tested. In response to determining that the last available frequency setting for the notch filter 175 has been tested (1080—Y), at block 1090, the control unit 150 may apply the notch filter 175 having the new notch filter frequency.

In response to determining that the last available frequency setting for the notch filter 175 has not been tested (1080—N), the method may continue at operation 1020 with the next available frequency setting for the notch filter 175.

In accordance with certain aspects of the present disclosure, the VCM 135 may be utilized to induce a vibration signal within a range of possible resonance frequencies, for example about 44±10 kHz or another range, of the resonance frequency of the shock sensor 165. The VCM 135 may be driven by a VCM drive signal 157 generated by a VCM control circuit 155. The VCM control circuit 155 may include a current control loop (CCL) and the VCM drive signal 157 may be generated by the CCL. If the bandwidth of the CCL is greater than the resonance frequency of the shock sensor 165, the frequency of the VCM drive signal 157 may be adjusted around the resonance frequency of the shock sensor 165 while monitoring the output signal 162 of the shock detection system 160 for a maximum noise level (e.g., maximum RMS noise level or maximum P-P noise level). A resonance frequency detection and notch filter selection scheme similar to the scheme described with respect to the spindle drive signal 142 generated by the PWM 140 may be implemented.

The VCM drive signal 157 may be implemented in firmware and may be, for example, but not limited to, a sine wave, a triangle wave, or a square wave. A VCM drive signal 157 having a frequency near or below half of the resonant frequency of the shock sensor 165 may produce harmonics that could excite the resonance causing erroneous results.

If the bandwidth of the CCL is lower than the resonance frequency of the shock sensor 165, voltage mode excitation of the VCM 135 may be used and the frequency of the VCM voltage drive signal adjusted in small frequency adjustment bands around the resonance frequency of the shock sensor 165, but for large frequency adjustment bands around the resonance frequency of the shock sensor 165 the VCM voltage drive signal amplitude vs. frequency may be controlled.

Figure 11:
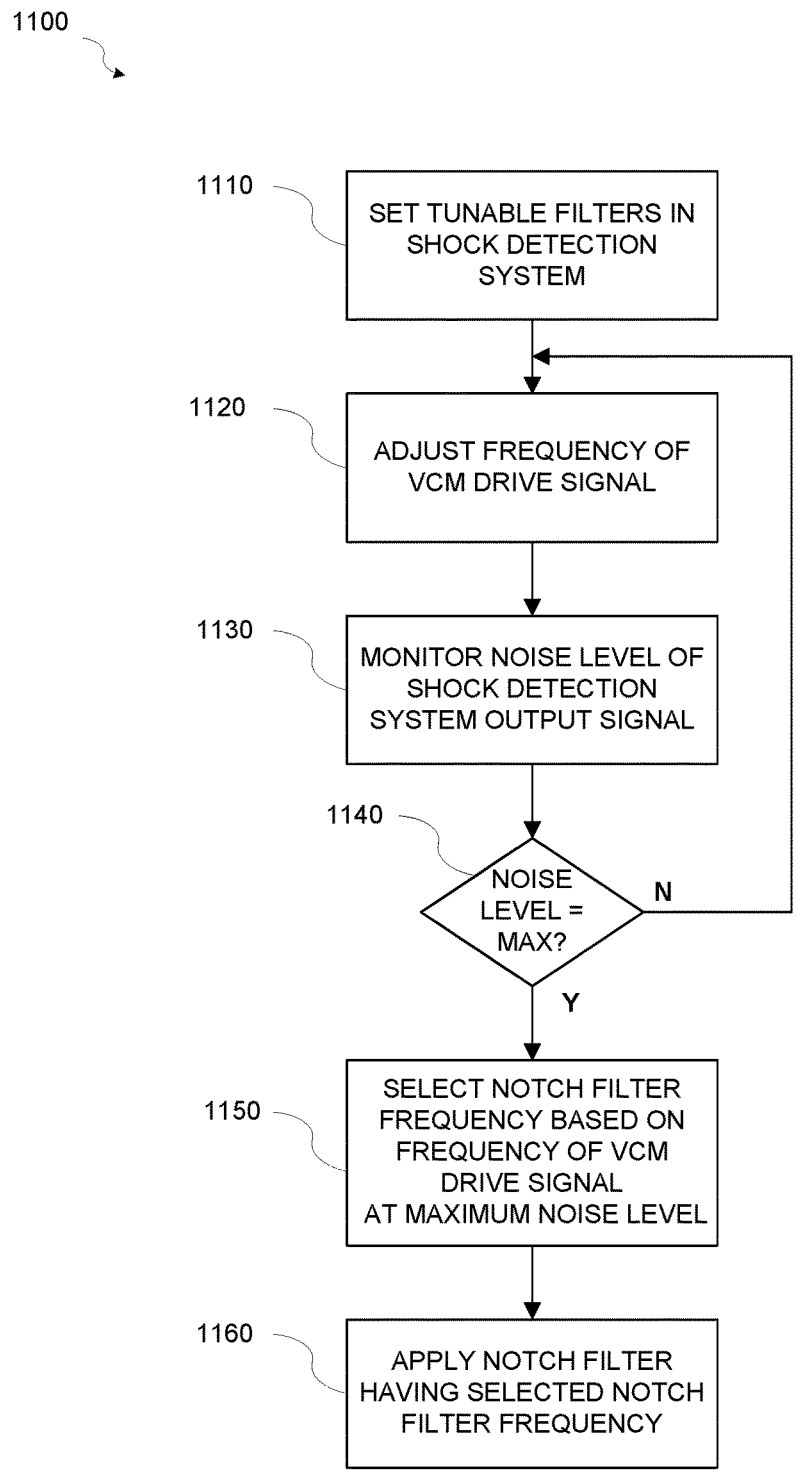
FIG. 11 is a flowchart illustrating a method for detecting shock sensor resonance in a DSD and tuning a notch filter in accordance with various aspects of the present disclosure.

FIG. 11 is a flowchart illustrating a method 1100 for detecting shock sensor resonance in a DSD 100 and tuning a notch filter in accordance with various aspects of the present disclosure. Referring to FIG. 11, at block 1110 tunable filters (e.g., the firmware-tunable filters 180) in the shock detection system 160 may be set to provide maximum amplification of signal frequencies near a resonance frequency of the shock sensor 165 while suppressing other frequencies.

At block 1120, the frequency of the VCM drive signal 157 may be adjusted up or down in increments of about 200 Hz or another increment within a range of possible shock sensor resonance frequencies, for example about 44±10 kHz or another range, in order to cause a small vibration in the VCM 135. For example, the control unit 150 may control the VCM control circuit 155 to repeatedly adjust the frequency of the VCM drive signal 157 up or down in increments of about 200 Hz or another increment.

At block 1130, the noise level of the output signal 162 of the shock detection system 160 may be monitored as the frequency of the VCM drive signal 157 is adjusted and the noise level of the output signal 162 may reach a maximum. For example, the control unit 150 may sample the output signal 162 of the shock detection system 160 and calculate maximum root-mean-square (RMS) noise while controlling the VCM control circuit 155 to adjust the frequency of the VCM drive signal 157. Alternatively, the control unit 150 may calculate maximum peak-to-peak (P-P) noise, or any other noise figure of merit, while controlling the VCM control circuit 155 to adjust the frequency of the VCM drive signal 157 through the range of frequency settings.

At block 1140, it may be determined whether the noise level of the output signal 162 of the shock detection system 160 has reached a maximum. For example, the control unit 150 may determine that the RMS or P-P noise level of the output signal 162 is decreasing from a higher value. When a current noise level calculation at a current VCM drive signal 157 frequency setting results in a lower output signal 162 noise level than a noise level calculated at an immediately preceding VCM drive signal 157 frequency setting, the control unit 150 may determine that the previous output signal 162 noise level is the maximum noise level. The previous higher value may be determined as the maximum noise level.

Alternatively, output signal 162 noise levels may be calculated for each VCM drive signal 157 frequency setting in a predetermined range of frequency settings, for example about 44±10 kHz or another range, and the maximum output signal 162 noise level selected from the calculated noise levels.

The output signal 162 noise level may reach a maximum when the frequency of the VCM drive signal 157 overlaps with and excites the resonance frequency of the shock sensor 165. In response to determining that the output signal 162 of the shock detection system 160 has not reached a maximum (1140—N), at block 1120 the frequency of the VCM drive signal 157 may continue to be adjusted.

In response to determining that the output signal 162 of the shock detection system 160 has reached a maximum (1140—Y), at block 1150 a notch filter frequency may be selected based on the frequency of the VCM drive signal 157 at the maximum noise level. For example, the notch filter frequency may be selected based on the frequency at which the RMS or P-P noise reaches a maximum. The notch filter frequency may be selected within a predetermined range, for example within ±2 kHz or another range, of the resonance frequency of the shock sensor 165. At block 1160, the control unit 150 may apply the notch filter 175 having the selected notch filter frequency To verify that the optimum notch filter frequency was selected, the worst-case frequency of the VCM drive signal 157 (i.e., the output of the VCM control circuit 155 generating the VCM drive signal 157 producing the maximum output signal 162 noise level of the shock detection system 160) may be maintained while adjusting the notch filter through the nearest available frequency settings to the selected frequency for the notch filter 175, for example, within a range of about ±10 kHz of the selected notch filter frequency. The notch filter frequency may be selected within a predetermined range, for example within ±2 kHz or another range, of the resonance frequency of the shock sensor 165.

Figure 12:
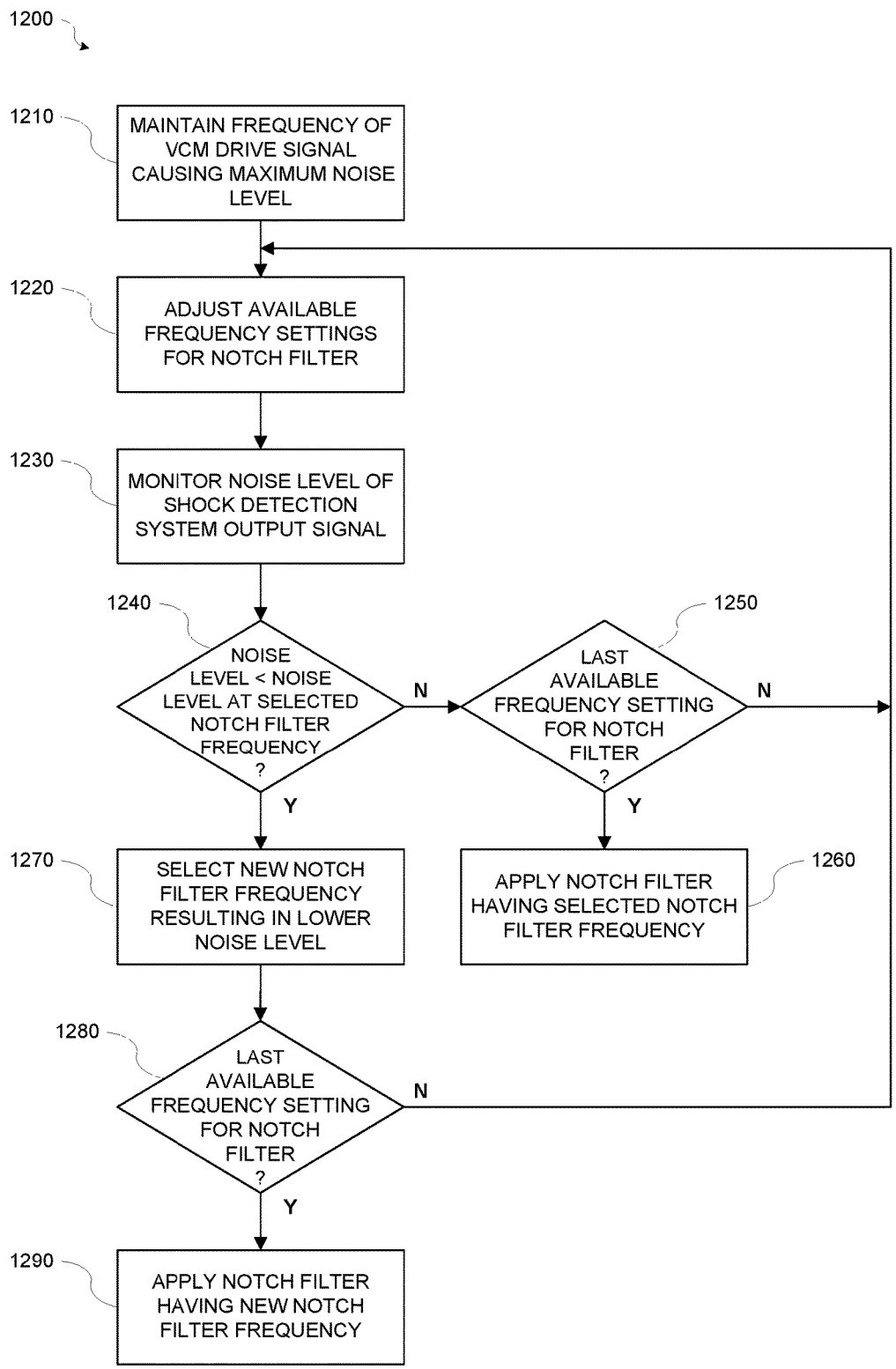
FIG. 12 is a flowchart illustrating a method for verifying that the optimum notch filter frequency was selected in accordance with various aspects of the present disclosure.

FIG. 12 is a flowchart illustrating a method 1200 for verifying that the optimum notch filter frequency was selected in accordance with various aspects of the present disclosure. Referring to FIG. 12, at block 1210 and the control unit 150 may control the VCM control circuit 155 to maintain the frequency setting of the VCM drive signal 157 causing the maximum noise level of the shock detection system output signal 162. At block 1220 the notch filter frequency may be adjusted up or down in increments of about 100 Hz or another increment within a range of available notch filter frequency settings around the selected notch filter frequency. For example, the control unit 150 may control the notch filter 175 to repeatedly adjust the notch filter frequency setting up or down in increments of about 100 Hz or another increment.

At block 1230, the noise level of the output signal 162 of the shock detection system 160 may be monitored as the notch filter frequency setting is adjusted. At block 1240, it may be determined whether the noise level of the output signal 162 of the shock detection system 160 decreases from the noise level at the selected notch filter frequency. For example, the control unit 150 may determine that the noise level of the output signal 162 is decreasing from a higher value. When a current noise level calculation at a current notch filter frequency setting results in a lower output signal 162 noise level than a noise level calculated at the selected notch filter frequency, the control unit 150 may determine that the current notch filter frequency is a candidate for a new notch filter frequency Alternatively, output signal 162 noise levels may be calculated for each notch filter frequency in a predetermined range of notch filter frequencies around the selected notch filter frequency, for example about 44±10 kHz or another range, and the minimum noise level may be determined.

In response to determining that the current noise level of the output signal 162 of the shock detection system 160 at the current notch filter frequency is not less than the noise level at the selected notch filter frequency (1240—N), at block 1250 the control unit 150 may determine whether the last available frequency setting for the notch filter 175 has been tested. In response to determining that the last available frequency setting for the notch filter 175 has been tested (1250—Y), at block 1260 the control unit 150 may apply the notch filter 175 having the selected notch filter frequency.

In response to determining that the last available frequency setting for the notch filter 175 has not been tested (1250—N), the method may continue at operation 1020 with the next available frequency setting for the notch filter 175.

In response to determining that the noise level of the output signal 162 of the shock detection system 160 at the current notch filter frequency is less than the noise level at the selected notch filter frequency (1240—Y), at block 1270 the control unit 150 may select the current notch filter frequency as a new notch filter frequency.

At block 1280 the control unit 150 may determine whether the last available frequency setting for the notch filter 175 has been tested. In response to determining that the last available frequency setting for the notch filter 175 has been tested (1280—Y), at block 1290, the control unit 150 may apply the notch filter 175 having the new notch filter frequency.

In response to determining that the last available frequency setting for the notch filter 175 has not been tested (1280—N), the method may continue at operation 1220 with the next available frequency setting for the notch filter 175.

In accordance with various aspects of the present disclosure, the methods 700, 900, and 1100 for detecting shock sensor resonance in a DSD 100 and the method 800, 1000, and 1200 for verifying that the optimum notch filter. frequency was selected may be performed as part of factory calibration of the DSD 100 or may be performed as part of DSD 100 calibration in the field While certain embodiments have been described, these embodiments have been presented by way of example only, and are not intended to limit the scope of the protection. The methods and systems described herein may be embodied in a variety of other forms. Various omissions, substitutions, and/or changes in the form of the example methods and systems described herein may be made without departing from the spirit of the protection.

The accompanying claims and their equivalents are intended to cover such forms or modifications as would fall within the scope and spirit of the protection. For example, the example systems and methods disclosed herein can be applied to hard disk drives, hybrid hard drives, and the like. In addition, other forms of storage, for example, but not limited to, DRAM or SRAM, battery backed-up volatile DRAM or SRAM devices, EPROM, EEPROM memory, etc., may additionally or alternatively be used. As another example, the various components illustrated in the figures may be implemented as software and/or firmware on a processor, ASIC/FPGA, or dedicated hardware. Also, the features and attributes of the specific example embodiments disclosed above may be combined in different ways to form additional embodiments, all of which fall within the scope of the present disclosure.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A method of tuning a notch filter in a data storage device (DSD) including the notch filter and a shock detection system, the method comprising:
adjusting pulse width modulator (PWM) frequency settings of a spindle drive signal;
detecting a maximum noise level of an output signal of the shock detection system while adjusting the PWM frequency settings; and
selecting a notch filter frequency corresponding to a PWM frequency setting at which the maximum noise level of the output signal of the shock detection system is detected.

2. The method of claim 1, further comprising applying the notch filter having a selected notch filter frequency,
wherein the selected notch filter frequency is within a predetermined range of a resonance frequency of a shock sensor included in the shock detection system.

3. The method of claim 1, further comprising:
before adjusting the PWM frequency settings of the spindle drive signal, setting tunable filters in the shock detection system to provide maximum amplification of signal frequencies near a resonance frequency of a shock sensor while suppressing other frequencies.

4. The method of claim 1, further comprising:
maintaining the PWM frequency setting at which the maximum noise level of the output signal of the shock detection system is detected; and
adjusting frequency settings for the notch filter within a predetermined frequency range around a selected notch filter frequency.

5. The method of claim 4, further comprising:
determining that a frequency setting for the notch filter within the predetermined frequency range provides increased noise suppression of the output signal of the shock detection system over the selected notch filter frequency;
in response to determining that a frequency setting for the notch filter within the predetermined frequency range provides increased noise suppression of the output signal of the shock detection system, selecting the frequency setting for the notch filter as a new notch filter frequency; and
applying the notch filter having a selected new notch filter frequency.

6. A data storage device (DSD), comprising:
a shock detection system configured to provide an output signal corresponding to physical shock to the DSD;
a notch filter configured to filter the output signal of the shock detection system;
a pulse width modulator (PWM) configured to provide a spindle drive signal to a spindle motor; and
a control unit operatively coupled to the shock detection system, the PWM, and the notch filter, the control unit configured to:
control the PWM to adjust frequency settings of the spindle drive signal;
detect a maximum noise level of the output signal of the shock detection system while controlling the PWM to adjust the frequency settings; and
select a notch filter frequency corresponding to a PWM frequency setting at which the maximum noise level of the output signal of the shock detection system is detected.

7. The DSD of claim 6, wherein the control unit is further configured to control the notch filter to apply a selected notch filter frequency,
wherein the selected notch filter frequency is within a predetermined range of a resonance frequency of a shock sensor included in the shock detection system.

8. The DSD of claim 6, wherein the control unit is further configured to:
before adjusting the PWM frequency settings of the spindle drive signal, set tunable filters in the shock detection system to provide maximum amplification of signal frequencies near a resonance frequency of a shock sensor while suppressing other frequencies.

9. The DSD of claim 6, wherein the control unit is further configured to:
maintain the PWM frequency setting at which the maximum noise level of the output signal of the shock detection system is detected; and
adjust frequency settings for the notch filter within a predetermined frequency range around a selected notch filter frequency.

10. The DSD of claim 9, wherein the control unit is further configured to:
determine whether a frequency setting for the notch filter within the predetermined frequency range provides increased noise suppression of the output signal of the shock detection system over the selected notch filter frequency;
in response to determining that a frequency setting for the notch filter within the predetermined frequency range provides increased noise suppression of the output signal of the shock detection system, select the frequency setting for the notch filter as a new notch filter frequency; and
apply the notch filter having a selected new notch filter frequency.

11. A method of tuning a notch filter in a data storage device (DSD) including the notch filter and a shock detection system, the method comprising:
inducing a vibration in a shock sensor of the shock detection system by supplying an alternating current (AC) voltage signal to a ceramic capacitor disposed near the shock sensor;
adjusting a frequency of the AC voltage signal in a range around a resonance frequency of the shock sensor;
detecting a maximum noise level of an output signal of the shock detection system while adjusting the frequency of the AC voltage signal; and
selecting a notch filter frequency corresponding to the frequency of the AC voltage signal at which the maximum noise level of the output signal of the shock detection system is detected.

12. The method of claim 11, further comprising applying the notch filter having a selected notch filter frequency,
wherein the selected notch filter frequency is within a predetermined range of the resonance frequency of the shock sensor.

13. The method of claim 11, further comprising:
before adjusting the frequency of the AC voltage signal, setting tunable filters in the shock detection system to provide maximum amplification of signal frequencies near the resonance frequency of the shock sensor while suppressing other frequencies.

14. The method of claim 11, further comprising:
maintaining the frequency of the AC voltage signal at which the maximum noise level of the output signal of the shock detection system is detected; and
adjusting frequency settings for the notch filter within a predetermined frequency range around a selected notch filter frequency.

15. The method of claim 14, further comprising:
determining that a frequency setting for the notch filter within the predetermined frequency range provides increased noise suppression of the output signal of the shock detection system over the selected notch filter frequency;
in response to determining that a frequency setting for the notch filter within the predetermined frequency range provides increased noise suppression of the output signal of the shock detection system, selecting the frequency setting for the notch filter as a new notch filter frequency; and
applying the notch filter having a selected new notch filter frequency.

16. A data storage device (DSD), comprising:
a shock detection system configured to provide an output signal corresponding to physical shock to the DSD;
a notch filter configured to filter the output signal of the shock detection system;
a capacitor drive circuit configured to supply an alternating current (AC) voltage signal to a ceramic capacitor disposed near a shock sensor of the shock detection system; and
a control unit operatively coupled to the shock detection system, the capacitor drive circuit, and the notch filter, the control unit configured to:
control the capacitor drive circuit to adjust frequency settings of the AC voltage signal;
detect a maximum noise level of the output signal of the shock detection system while controlling the capacitor drive circuit to adjust the frequency settings; and
select a notch filter frequency corresponding to an AC voltage signal frequency setting at which the maximum noise level of the output signal of the shock detection system is detected.

17. The DSD of claim 16, wherein the control unit is further configured to control the notch filter to apply a selected notch filter frequency,
wherein the selected notch filter frequency is within a predetermined range of a resonance frequency of the shock sensor included in the shock detection system.

18. The DSD of claim 16, wherein the control unit is further configured to:
before controlling the capacitor drive circuit to adjust the frequency settings of the AC voltage signal, set tunable filters in the shock detection system to provide maximum amplification of signal frequencies near a resonance frequency of the shock sensor while suppressing other frequencies.

19. The DSD of claim 16, wherein the control unit is further configured to:
control the capacitor drive circuit to maintain the AC voltage signal frequency setting at which the maximum noise level of the output signal of the shock detection system is detected; and
adjust frequency settings for the notch filter within a predetermined frequency range around a selected notch filter frequency.

20. The DSD of claim 19, wherein the control unit is further configured to:
determine whether a frequency setting for the notch filter within the predetermined frequency range provides increased noise suppression of the output signal of the shock detection system over the selected notch filter frequency;
in response to determining that a frequency setting for the notch filter within the predetermined frequency range provides increased noise suppression of the output signal of the shock detection system, select the frequency setting for the notch filter as a new notch filter frequency; and
apply the notch filter having a selected new notch filter frequency.

21. A method of tuning a notch filter in a data storage device (DSD) including the notch filter and a shock detection system, the method comprising:
inducing a vibration in a shock sensor of the shock detection system by supplying a voice control motor (VCM) drive signal to a VCM;
adjusting a frequency of the VCM drive signal in a range around a resonance frequency of the shock sensor;
detecting a maximum noise level of an output signal of the shock detection system while adjusting the frequency of the VCM drive signal; and
selecting a notch filter frequency corresponding to the frequency of the VCM drive signal at which the maximum noise level of the output signal of the shock detection system is detected.

22. The method of claim 21, further comprising applying the notch filter having a selected notch filter frequency,
wherein the selected notch filter frequency is within a predetermined range of the resonance frequency of the shock sensor.

23. The method of claim 21, further comprising:
before adjusting the frequency of the VCM drive signal, setting tunable filters in the shock detection system to provide maximum amplification of signal frequencies near the resonance frequency of the shock sensor while suppressing other frequencies.

24. The method of claim 21, further comprising:
maintaining the frequency of the VCM drive signal at which the maximum noise level of the output signal of the shock detection system is detected; and
adjusting frequency settings for the notch filter within a predetermined frequency range around a selected notch filter frequency.

25. The method of claim 24, further comprising:
determining that a frequency setting for the notch filter within the predetermined frequency range provides increased noise suppression of the output signal of the shock detection system over the selected notch filter frequency;
in response to determining that a frequency setting for the notch filter within the predetermined frequency range provides increased noise suppression of the output signal of the shock detection system, selecting the frequency setting for the notch filter as a new notch filter frequency; and
applying the notch filter having a selected new notch filter frequency.

26. A data storage device (DSD), comprising:
a shock detection system configured to provide an output signal corresponding to physical shock to the DSD;
a notch filter configured to filter the output signal of the shock detection system;
a voice coil motor (VCM) control circuit configured to supply a VCM drive signal to the VCM; and a control unit operatively coupled to the shock detection system, the VCM control circuit, and the notch filter, the control unit configured to:
- control the VCM control circuit to adjust frequency settings of the VCM drive signal;
- detect a maximum noise level of the output signal of the shock detection system while controlling the VCM control circuit to adjust the frequency settings; and
- select a notch filter frequency corresponding to a VCM drive signal frequency setting at which the maximum noise level of the output signal of the shock detection system is detected.

27. The DSD of claim 26, wherein the control unit is further configured to control the notch filter to apply a selected notch filter frequency,
wherein the selected notch filter frequency is within a predetermined range of a resonance frequency of a shock sensor included in the shock detection system.

28. The DSD of claim 26, wherein the control unit is further configured to:
before controlling the VCM control circuit to adjust the frequency settings of the VCM drive signal, set tunable filters in the shock detection system to provide maximum amplification of signal frequencies near a resonance frequency of a shock sensor while suppressing other frequencies.

29. The DSD of claim 26, wherein the control unit is further configured to:
control the VCM control circuit maintain the VCM drive signal frequency setting at which the maximum noise level of the output signal of the shock detection system is detected; and
adjust frequency settings for the notch filter within a predetermined frequency range around a selected notch filter frequency.

30. The DSD of claim 29, wherein the control unit is further configured to:
determine whether a frequency setting for the notch filter within the predetermined frequency range provides increased noise suppression of the output signal of the shock detection system over the selected notch filter frequency;
in response to determining that a frequency setting for the notch filter within the predetermined frequency range provides increased noise suppression of the output signal of the shock detection system, select the frequency setting for the notch filter as a new notch filter frequency; and
apply the notch filter having a selected new notch filter frequency.

* * * * *